Nov. 25, 1952     O. J. SUNDSTRAND     2,618,851
CLIPPER
Filed March 21, 1950             2 SHEETS—SHEET 1
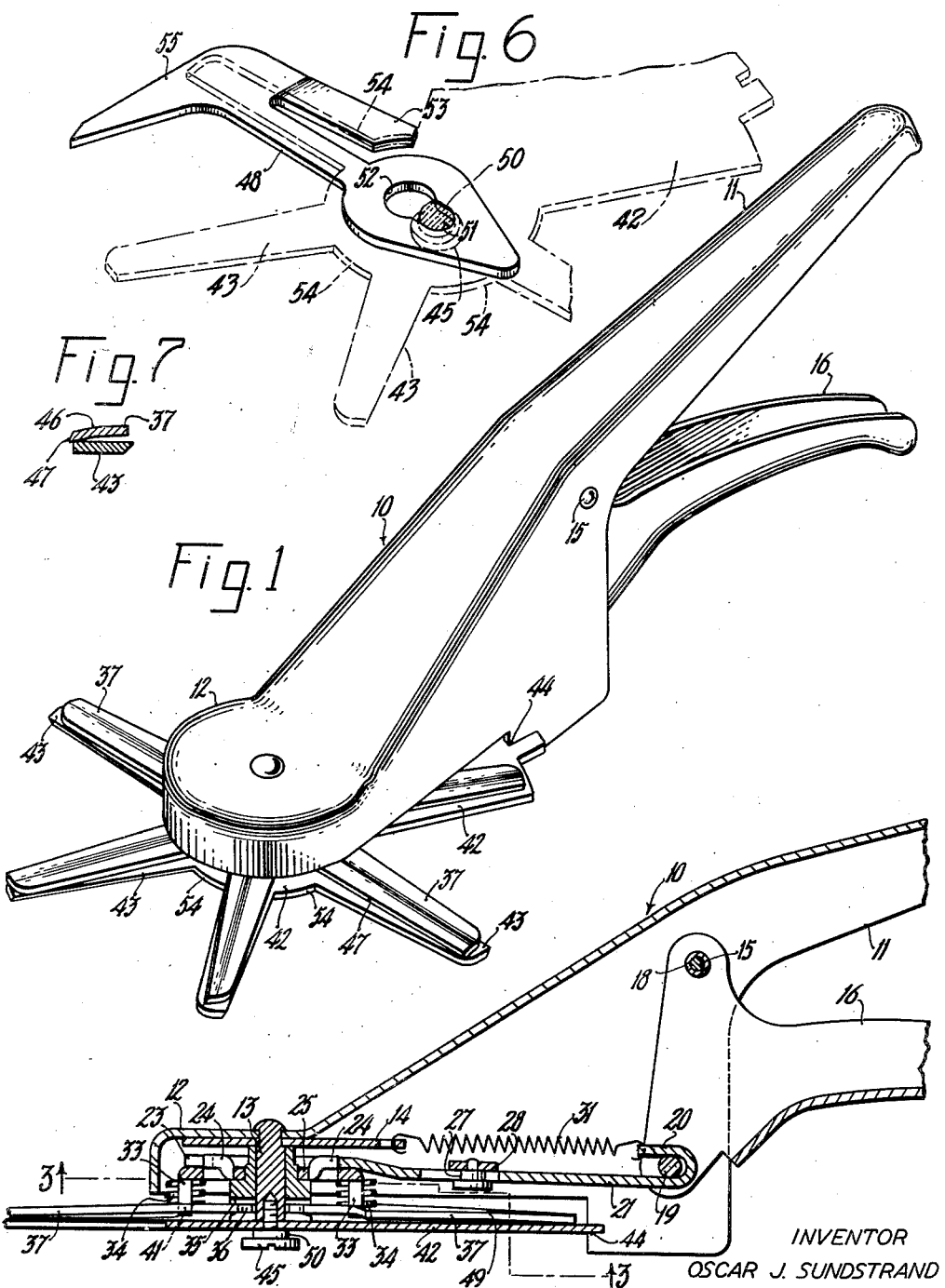
INVENTOR
OSCAR J. SUNDSTRAND
BY
*Jesse A. Holton*
ATTORNEY Nov. 25, 1952  O. J. SUNDSTRAND  2,618,851
CLIPPER Filed March 21, 1950  2 SHEETS—SHEET 2

INVENTOR
OSCAR J. SUNDSTRAND
BY
*Jose A. Holton*
ATTORNEY

Patented Nov. 25, 1952

2,618,851

UNITED STATES PATENT OFFICE 2,618,851

CLIPPER

Oscar J. Sundstrand, West Hartford, Conn.

Application March 21, 1950, Serial No. 150,967

20 Claims. (Cl. 30—207)

This invention relates to clippers for grass and other stem-like herbage and more particularly to such devices adapted for the trimming of lawn grasses in places which cannot be reached easily or at all by large hand or power mowers, such as lawn edges around walls and fences or around trees, shrubs, driveways, flower beds, and the like.

The invention has for one of its objects to provide a clipper for such purposes which shall be simple in its construction, of light weight and easy to operate.

Another object of the invention is to provide cooperating shear units, which shall have a maximum of leverage for good shearing action, which shall enable the operator to advance rapidly to trim a relatively wide area, which are adapted to effectively shear the interposed grass throughout the entire shearing operation and in which the blades of the shear unit have a continuous self-sharpening effect.

It is another object of the invention to provide a sturdy and inexpensive cutting tool having relatively rotatable opposed shear units composed of a plurality of slender blades in which the blades of one unit starting in registration with the blades of the other unit proceed under hand operation, and with ample leverage, to a registration with the next succeeding blades so that in each single cutting operation, constituted by one step of relative rotative movement between the cooperating units, a uniform force and shearing action will be exerted in all parts of the cutting area.

A still further object of the invention is to provide manually operable means with connections to a movable shear unit and with controls for the latter which restrict overrun and provide for positive stop of the blades of such unit as they come into registration with a series of fixed blades at the end of each cutting stroke.

The invention accordingly consists in the various features of construction, combinations of elements and arrangements of parts which will be exemplified by the following description read in connection with the accompanying drawings and the scope of the application of which will be set forth in the appended claims.

In the accompanying drawings wherein is shown one of various possible embodiments of the invention:

Fig. 1 is an isometric view of the improved clipper.

Fig. 2 is a sectional view taken along the longitudinal vertical median of the clipper shown in Fig. 1.

Fig. 6 is a view of an attachable guide unit. In dot and dash lines the fixed shear plate is shown overlying the guide unit and secured thereto by a central screw.

Fig. 7 is a view in transverse cross section of a pair of co-acting blades.

Figure 3:
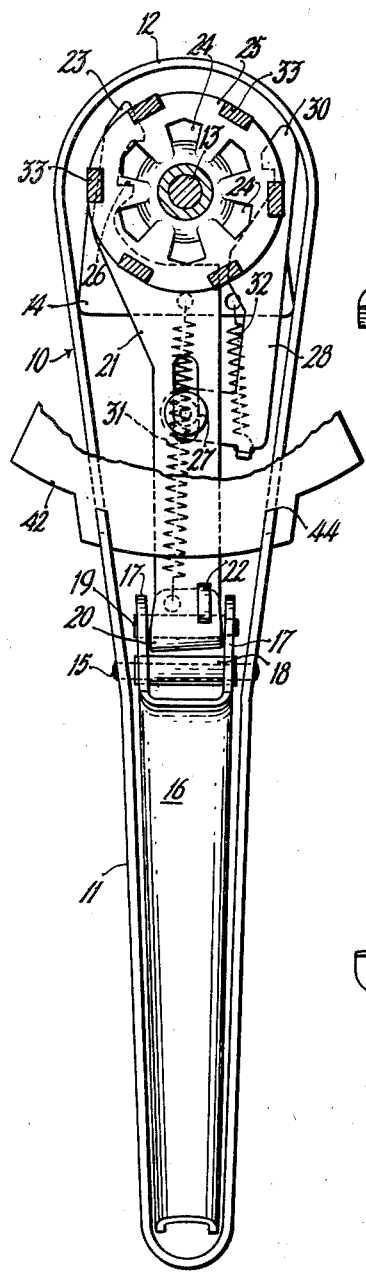
Fig. 3 is a sectional view of the clipper inverted from the positions shown in Figs. 1 and 2, the section being taken substantially on the line 3—3 of Fig. 2, looking in the direction of the arrows.
Figure 4:
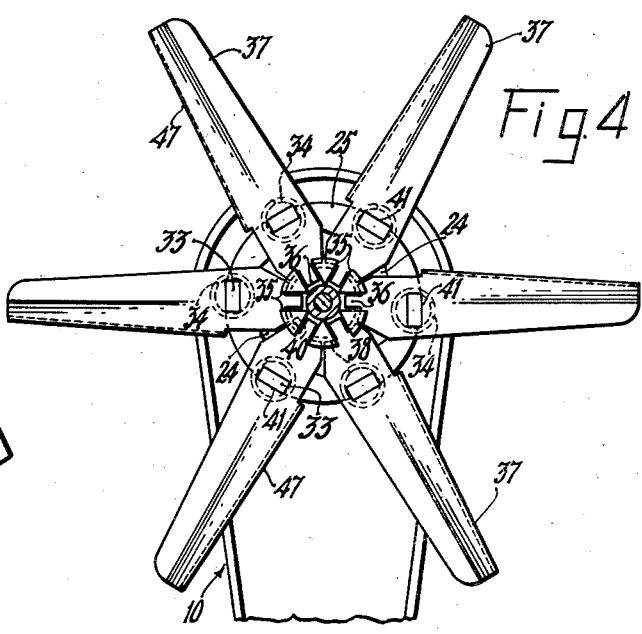
Fig. 4 is a view, also inverted, showing fully the rotatable unit shown in part in Fig. 3, with the loosely articulated blades of the movable unit in position. The parts are shown as fully assembled just prior to the locating of the fixed shear plate.
Figure 5:
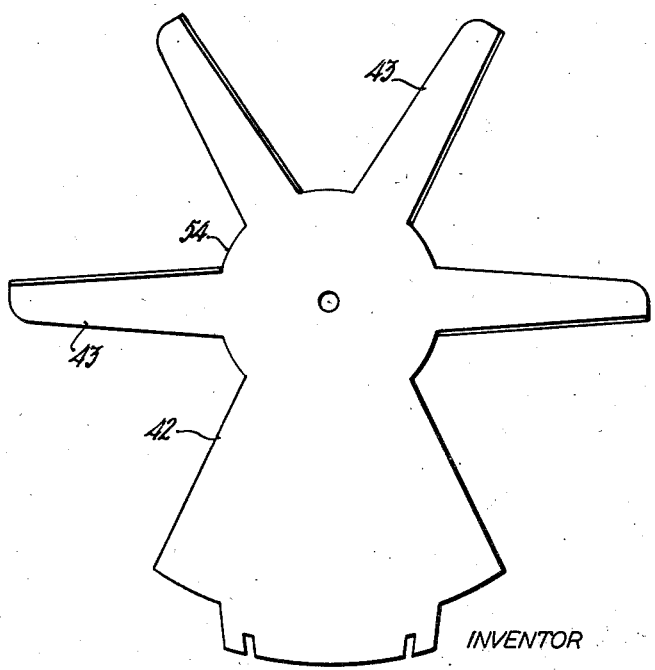
Fig. 5 is a view, also inverted, of the fixed shear plate which is mounted over the assembly of parts shown in Figs. 3 and 4.

Referring now more particularly to the drawings, a frame or housing 10 has a handle portion 11 and a head 12 to which a central post 13 is riveted or otherwise suitably held. A shoulder of post 13 secures an anchor plate 14 to the housing 10. Pivotally mounted on the housing at 15 is a cooperating handle 16 adapted to be moved relatively to the handle portion 11 by simple one-hand gripping movement. The handle 16 is generally U-shaped in cross section and is provided with ears 17 which are fitted within the housing 10 and carry a bushing 18 fitted over the pivot 15 to constitute the mounting. Around another pin 19 extending between the ears 17, one end 20 of an operating member 21 is curled and secured by a cotter pin 22. The operating member 21 has its forward end formed with a tooth 23 for engagement with angularly spaced lugs or teeth 24 struck out of a flange formed as part of a hub 25 which is mounted for rotation on the post 13. When the tooth 23 is engaged with a tooth 24 of the hub gripping of the handle parts will cause the operating member to rotate the hub a distance corresponding to the angular distance between its lugs 24. Another tooth 26 on the operating member 21 is adapted to take in on the opposite side of each lug or tooth 24 and control the rotative movement of the hub against running ahead of the pull of the operating member.

Loosely articulated with the operating member 21 as by pin-and-slot connection 27 is a link 28 having a tooth 30 which latter, under the influence of the gripping movement of the handle parts, allows one of the teeth 24 to escape in the rotative movement of the hub and subsequently as the lost motion is taken up enters into the path of the next succeeding tooth 24 and serves to stop rotation of the hub at the end of an angle of movement corresponding to the angular distance between teeth 24 on the hub.

After a gripping movement of the handle parts and release of the cooperating handle 16, a spring 31 attached to anchor plate 14 and operating member 21 retracts the latter to a position of reengagement of teeth 23 and 26 at opposite sides of tooth 24 of the hub ready for the next grip of the handle and consequent further rotative movement of the hub. A spring 32 connecting link 28 with the anchor plate 14 restores the link to normal position out of the orbit of teeth 24. Thus it will be seen that for every grip of the handle the hub 25 is given an angle of rotation with the advancing movement of it controlled against overrun and positive termination of the movement effected by the tooth 30.

The hub 25 is formed at the circumference of its flange with angularly spaced offset lugs 33 around each of which is fitted a coil spring 34. The hub is also radially slotted at 35 to receive ends 36 of blades 37. Other portions 38 of the blade ends fit into circumferential slots 40 of the hub whereby the blades are somewhat loosely articulated in the hub. Each blade is apertured at 41 to fit over a lug 33 and compress its associated coil spring 34.

In the present embodiment of the invention there are six such loosely-articulated blades which when associated with the rotatable hub form a rotatable shear unit operated and controlled in its movements by the handle portions and the operating members and links heretofore described.

A shear plate 42 having substantially radially extending blades 43 is fitted into the frame or housing 10, as indicated at 44, is compressed against the blades 37 of the movable unit, and is held securely in place by stud screw 45. The blades of each shear unit are so formed as to be in respective registration when the handle parts have been released and the operating member is spring-retracted to a position of reengagement with a lug 24 on the hub 25.

From the foregoing description it will be obvious that the rotatable shear unit is moved rotatably step-by-step in definite units, that the leverage exerted on all blades is uniform, and that at the end of each step movement there is a registration of the respective blades of the two units.

In the preferred form of the invention shown in the drawings and so far described herein, the movable blades 37 have an arcuate or bowed form in transverse cross section, as indicated at 46, and are slightly offset relative to the plane of their hub-engaging ends to insure that an advancing cutting edge 47 bears against the shear plate 42 with the body of the blade receding slightly therefrom. (See Fig. 7.) This shape of the cutting blade, together with the influence of the individual coil springs 34 on each separate cutting blade, which serves to depress the outer ends of the loose blades into the space between adjacent blades of the fixed shear unit, results in a continuous shear engagement throughout the length of every blade from its inner point of primary engagement to its outer extremity, while at the same time producing a self-sharpening effect upon the co-acting blades. The movable blades are preferably of spring steel slightly bowed lengthwise, as indicated at 49, to enhance the shearing and self-sharpening actions.

In Fig. 6 there is shown a protective unit and guide 48 which may be attached quickly and conveniently in any one of several positions with respect to the cutting blades and which may be readily detached when not desired for use. A shoulder 50 of the screw 45 is adapted to confine an inner portion 51 of the guide after the guide has been pressed down over the stud screw with the opening 52 in registration. A spring detent finger 53, slightly offset from the general plane of the guide, finds a locating position against the circumferential body 54 of the shear plate between the inner ends of fixed blades 43. When the unit 48 is so positioned, an angularly bent outer portion 55 of the unit serves as a guide or protective finger and may be located as desired on either side of the clipper or in advance of either of the forwardly extending blades. For trimming along curbs, walks, rails and the like, the portion 55 may be kept in lateral registration with these while the cutting blades are actuated by the relative movements of handles 11 and 16.

What I claim is:

1. The combination in a clipper comprising a frame and a shear plate fixed thereto having a plurality of substantially radially extending blades, of a uni-directional step-by-step rotatable shear unit mounted on said frame having blades normally respectively overlying the plate blades, means for moving the rotatable shear unit in uni-directional rotative step increments in shear relation with the plate blades, and means for stopping the rotatable shear unit with its blades in registration with the next succeeding blades of the plate, at the end of each step movement.

2. The combination in a clipper comprising a frame and a shear plate fixed thereto having a plurality of substantially radially extending blades, of a uni-directional step-by-step rotatable shear unit mounted on said frame having blades normally respectively overlying the plate blades, means comprising a handle and spring-retracted means operable by the handle for moving the rotatable shear unit in uni-directional rotative step increments in shear relation with the plate blades, and means for stopping the rotatable shear unit with its blades in registration with the next succeeding blades of the plate, at the end of each step movement.

3. The combination in a clipper comprising a frame and a shear plate fixed thereto having a plurality of substantially radially extending blades, a uni-directional step-by-step rotatable shear unit mounted on said frame having individually-spring-pressed loosely-mounted blades normally respectively overlying the plate blades, means for moving the rotatable shear unit in uni-directional rotative step increments in shear relation with the plate blades, and means for stopping the rotatable shear unit with its blades in registration with the next succeeding blades of the plate, at the end of each step movement.

4. The combination in a clipper comprising a frame and a shear plate fixed thereto having a plurality of substantially radially extending blades, of a uni-directional step-by-step rotatable shear unit mounted on said frame having blades normally respectively overlying the plate blades, means for moving the shear unit in uni-directional rotative step increments in shear relation with the plate blades, means for stopping the rotatable shear unit with its blades in registration with the next succeeding blades of the plate, at the end of each step movement, and means to control the rotatable shear unit against overrun in moving from one stepped position to next.

5. A clipper comprising a housing for operating parts, a plurality of blades in fixed relation to the housing and extending substantially radially beyond it, a plurality of movable blades respectively normally overlying the fixed blades in shear relationship, and means including a reciprocatory member for rotatively moving the movable blades step-by-step in a uniform direction to advance them with a shearing action to overlie successively the fixed blades at the end of each step of movement.

6. A clipper comprising a housing having a handle portion, a plurality of blades in fixed relation to the housing and extending substantially radially beyond it, a rotatable member in said housing having a plurality of movable blades respectively normally overlying the fixed blades in shear relationship, and means including a reciprocatory member and a handle pivoted to said housing, cooperative with the said handle portion of the housing, for rotatively moving the movable blades step-by-step in a uniform direction to advance them with a shear action to overlie successively the fixed blades at the end of each step of movement.

7. A clipper comprising a housing for operating parts, a plurality of blades in fixed relation to the housing and extending substantially radially beyond it, a plurality of movable blades respectively normally overlying the fixed blades in shear relationship, means including a reciprocatory member for rotatively moving the movable blades step-by-step in a uniform direction to advance them with a shear action to overlie successively the fixed blades at the end of each step of movement, and a quick detachable guide member adapted for attachment to the underside of the fixed blades and extending beyond the fixed blades.

8. A clipper comprising a housing for operating parts, a plurality of blades in fixed relation to the housing and extending substantially radially beyond it, a plurality of movable blades respectively normally overlying the fixed blades in shear relationship, means including a toothed rotatable hub in said housing, in which the movable blades are loosely held, and a spring retracted member operable to engage successive teeth of said hub for rotatively moving the movable blades step-by-step in a uniform direction direction to advance them with a shear action to overlie successively the fixed blades at the end of each step of movement.

9. A clipper comprising a housing for operating parts, a plurality of blades in fixed relation to the housing and extending substantially radially beyond it, a plurality of movable blades respectively normally overlying the fixed blades in shear relationship, means including a reciprocatory member for rotatively moving the movable blades step-by-step in a uniform direction to advance them with a shearing action to overlie successively the fixed blades at the end of each step of movement, and means for restricting overrun of the movable blades in the step movement.

10. A clipper comprising a housing for operating parts, a plurality of blades in fixed relation to the housing and extending substantially radially beyond it, a plurality of movable blades respectively normally overlying the fixed blades in shear relationship, means including a reciprocatory member for rotatively moving the movable blades step-by-step in a uniform direction to advance them with a shearing action to overlie successively the fixed blades at the end of each step of movement, means for restricting overrun of the movable blades in the step movement, and means for positively stopping the movable blades at the overlying position.

11. A clipper comprising a housing a handle portion, a cooperating handle articulated with said housing, a post fixed in said housing, a hub rotatable on said post having spaced teeth, a plurality of blades mounted on said hub to extend radially, a plate fixed to said post and said housing, below said hub, and having radially extending blades normally underlying the blades on the hub, an operating member for said hub movable with said cooperating handle and having a tooth-engaging portion normally positioned to engage a tooth on said hub for rotating the hub, a distance of angular movement corresponding to the space between said teeth, and means to restore said operating member to engage a succeeding tooth of the hub.

12. A clipper comprising a housing having a handle portion, a cooperating handle articulated with said housing, a post fixed in said housing, a hub rotatable on said post having spaced teeth, a plurality of blades mounted on said hub to extend radially, a plate fixed to said post and said housing, below said hub, and having radially extending blades normally underlying the blades on the hub, an operating member for said hub movable with said cooperating handle and having a tooth-engaging portion normally positioned to engage a tooth on said hub when the cooperating handle is moved, for rotating the hub a distance of angular movement corresponding to the space between said teeth, means to restore said operating member to position to engage a succeeding tooth of the hub, and an overrun-restricting tooth on said operating member.

13. The combination in a clipper comprising two cooperative shear units each having a plurality of substantially radially extending angularly-spaced blades, of means, including a movable handle, devices associated with said handle, for picking up at least one of said units and moving it a predetermined distance, and overthrow prevention means for causing a relative rotation of the units in definite step increments from a stop position with the blades of the different units in registration, to another stop position with the blades of one unit in registration with the next blades of the other unit.

14. A clipper comprising a housing having a handle portion, a cooperating handle articulated with said housing, a post fixed in said housing, a hub rotatable on said post having spaced teeth, a plurality of blades loosely mounted on said hub to extend radially, a plate fixed to said post and said housing below said hub and having radially extending blades normally underlying the blades on the hub, an operating member for said hub movable with said cooperating handle and having a tooth-engaging portion normally positioned to engage a tooth on said hub, for rotating the hub upon movement of said cooperating handle, a distance of angular movement corresponding to the space between said teeth, means to restore said operating member to position to engage a succeeding tooth of the hub, and individual spring means for each blade of the hub urging it yieldingly in continuous shear relation with its co-acting blade on the plate as the hub advances in a step of angular movement.

15. In a clipper comprising a frame having a handle portion, a cooperating handle articulated with the frame and a shear plate fixed to said frame having a plurality of substantially radially extending blades, the combination of a rotatable shear unit having extending blades normally overlying respectively the blades of the plate, and means operative in response to relative movement between the cooperating handle and said handle portion for causing step-by-step movement of the rotatable shear unit and the stopping of each step movement with the blades of the shear unit in registration with the blades of the plate.

16. In a clipper comprising a frame having a handle portion, a cooperating handle articulated with the frame and a shear plate fixed to said frame having a plurality of substantially radially extending blades, the combination of a rotatable shear unit having extending blades normally overlying respectively the blades of the plate, and means operative in response to relative movement between the cooperating handle and said handle portion for causing step-by-step movement of the rotatable shear unit and the stopping of each step movement with the blades of the shear unit in registration with the blades of the plate, and means for controlling the rotatable shear unit in its step movement to restrict overrun.

17. In a clipper comprising a frame having a handle portion, a cooperating handle articulated with the frame and a shear plate fixed to said frame having a plurality of substantially radially extending blades, the combination of a rotatable shear unit having loosely-mounted spring-pressed extending blades normally overlying respectively the blades of the plate, and means operative in response to relative movement between the cooperating handle and said handle portion and comprising teeth on the rotatable shear unit and pawls for timed engagement therewith, for causing step-by-step movement of the rotatable shear unit and the stopping of each step movement with the blades of the rotatable shear unit in registration with the blades of the plate.

18. A clipper having a frame and two cooperatively associated shear units each comprising a plurality of angularly spaced substantially radially extending blades, and means for effecting relative rotation of the units, the blades of at least one of the units being individually spring-pressed toward the blades of the other unit to yieldingly depress their outer ends into the spaces between the blades of the other unit during said rotation to cause a continuous shearing engagement of cooperating blades of the two units throughout the entire length of the blades.

19. A clipper having a frame and two cooperatively associated shear units each comprising a plurality of angularly spaced substantially radially extending blades, and means for effecting relative rotation of the units, the blades of at least one of the units being of transversely bowed spring-metal and being also individually spring-pressed toward the blades of the other unit to yieldingly depress their outer ends into the spaces between the blades of the other unit during said rotation to cause a continuous shearing engagement of cooperating blades of the two units throughout the entire length of the blades.

20. A hand-operated clipper comprising two relatively rotatable shear units each having a plurality of substantially radially extending angularly-spaced blades, and handle-operated means, including a reciprocating device and a stop rendered effective by movement in one direction of said reciprocating device, for causing relative rotation of the units to relatively move the blades in definite step increments.

OSCAR J. SUNDSTRAND.

REFERENCES CITED

The following references are of record in the file of this patent:

UNITED STATES PATENTS

| Number | Name | Date |
| --- | --- | --- |
| 98,098 | Ollis | Dec. 21, 1869 |
| 376,233 | Cameron | Jan. 10, 1888 |
| 1,868,918 | Schenk | July 26, 1932 |
| 2,028,784 | Jennett | Jan. 28, 1936 |
| 2,119,021 | Moskovics et al. | May 31, 1938 |
| 2,238,278 | Moskovics et al. | Apr. 15, 1941 |
| 2,401,292 | Aaron | June 4, 1946 |
| 2,471,194 | Capps | May 24, 1949 |

FOREIGN PATENTS

| Number | Country | Date |
| --- | --- | --- |
| 638,048 | France | May 14, 1928 |